US007724492B2

(12) United States Patent
Botvinnik

(10) Patent No.: US 7,724,492 B2

(45) Date of Patent: May 25, 2010

(54) EMITTER ELECTRODE HAVING A STRIP SHAPE

(75) Inventor: Igor Y. Botvinnik, Novato, CA (US)

(73) Assignee: Tessera, Inc., San Jose, CA (US)

(*) Notice: Subject to any disclaimer, the term of this patent is extended or adjusted under 35 U.S.C. 154(b) by 0 days.

(21) Appl. No.: 11/781,078

(22) Filed: Jul. 20, 2007

(65) Prior Publication Data

US 2008/0030919 A1 Feb. 7, 2008

Related U.S. Application Data

(63) Continuation-in-part of application No. 11/007,734, filed on Dec. 8, 2004, now Pat. No. 7,517,505, which is a continuation of application No. 10/717,420, filed on Nov. 19, 2003, now abandoned, application No. 11/781,078, which is a continuation-in-part of application No. 10/791,561, filed on Mar. 2, 2004, now Pat. No. 7,517,503.

(60) Provisional application No. 60/500,437, filed on Sep. 5, 2003.

(51) Int. Cl.
*H02H 1/00* (2006.01)

(52) U.S. Cl. ........................................ 361/230; 361/212

(58) Field of Classification Search ................. 361/212, 361/214, 220, 225, 230; 96/67, 69, 79; 204/164; 422/186.04

See application file for complete search history.

(56) References Cited

U.S. PATENT DOCUMENTS 653,421 A 7/1900 Lorey
895,729 A 8/1908 Carlborg
995,958 A 6/1911 Goldberg
1,791,338 A 2/1931 Wintermute
1,869,335 A 7/1932 Day
1,882,949 A 10/1932 Ruder
2,129,783 A 9/1938 Penney
2,247,409 A 7/1941 Roper
2,327,588 A 8/1943 Bennett
2,359,057 A 9/1944 Skinner
2,509,548 A 5/1950 White (Continued)

FOREIGN PATENT DOCUMENTS

CN 2111112 U 7/1972
CN 87210843 U 7/1988
CN 2138764 Y 6/1993
CN 2153231 Y 12/1993
CN 2174002 Y 8/1994

(Continued)

OTHER PUBLICATIONS

Holmes HAP 650/ Bionaire BAP 650, Holmes/ Bionaire, Dec. 2003, or earlier.

(Continued)

*Primary Examiner*—Danny Nguyen

(74) *Attorney, Agent, or Firm*—Zagorin O'Brien Graham LLP

(57) ABSTRACT

A strip-shaped emitter electrode including at least one emission edge extending along the length of such emitter electrode. When the strip-shaped emitter electrode is coupled to a voltage supply, current or an electrical charge at the emission edge ionizes the air and generates corona discharge, resulting in ion production. Erosion occurs at the emission edge such that the lifespan of the strip emitter electrode is dependent, at least in part, on the width of the strip emitter electrode.

22 Claims, 3 Drawing Sheets

U.S. PATENT DOCUMENTS

| | | | |
|---|---|---|---|
| 2,590,447 | A | 3/1952 | Nord et al. |
| 2,949,550 | A | 8/1960 | Brown |
| 2,978,066 | A | 4/1961 | Nodolf |
| 3,018,394 | A | 1/1962 | Brown |
| 3,026,964 | A | 3/1962 | Penney |
| 3,374,941 | A | 3/1968 | Okress |
| 3,412,530 | A | 11/1968 | Cardiff |
| 3,518,462 | A | 6/1970 | Brown |
| 3,540,191 | A | 11/1970 | Herman |
| 3,566,069 | A * | 2/1971 | Henderson .................. 219/70 |
| 3,581,470 | A | 6/1971 | Aitkenhead et al. |
| 3,638,058 | A | 1/1972 | Fritzius |
| 3,744,216 | A | 7/1973 | Halloran |
| 3,806,763 | A | 4/1974 | Masuda |
| 3,892,927 | A | 7/1975 | Lindenberg |
| 3,945,813 | A | 3/1976 | Iinoya et al. |
| 3,958,960 | A | 5/1976 | Bakke |
| 3,958,961 | A | 5/1976 | Bakke |
| 3,958,962 | A | 5/1976 | Hayashi |
| 3,981,695 | A | 9/1976 | Fuchs |
| 3,984,215 | A | 10/1976 | Zucker |
| 3,988,131 | A | 10/1976 | Kanazawa et al. |
| 4,007,024 | A | 2/1977 | Sallee et al. |
| 4,052,177 | A | 10/1977 | Kide |
| 4,056,372 | A | 11/1977 | Hayashi |
| 4,070,163 | A | 1/1978 | Kolb et al. |
| 4,074,983 | A | 2/1978 | Bakke |
| 4,092,134 | A | 5/1978 | Kikuchi |
| 4,097,252 | A | 6/1978 | Kirchhoff et al. |
| 4,102,654 | A | 7/1978 | Pellin |
| 4,104,042 | A | 8/1978 | Brozenick |
| 4,110,086 | A | 8/1978 | Schwab et al. |
| 4,119,415 | A | 10/1978 | Hayashi et al. |
| 4,126,434 | A | 11/1978 | Keiichi |
| 4,138,233 | A | 2/1979 | Masuda |
| 4,147,522 | A | 4/1979 | Gonas et al. |
| 4,155,792 | A | 5/1979 | Gelhaar et al. |
| 4,171,975 | A | 10/1979 | Kato et al. |
| 4,185,971 | A | 1/1980 | Isahaya |
| 4,189,308 | A | 2/1980 | Feldman |
| 4,205,969 | A | 6/1980 | Matsumoto |
| 4,209,306 | A | 6/1980 | Feldman et al. |
| 4,218,225 | A | 8/1980 | Kirchhoff et al. |
| 4,225,323 | A | 9/1980 | Zarchy et al. |
| 4,227,894 | A | 10/1980 | Proynoff |
| 4,231,766 | A | 11/1980 | Spurgin |
| 4,232,355 | A | 11/1980 | Finger et al. |
| 4,244,710 | A | 1/1981 | Burger |
| 4,244,712 | A | 1/1981 | Tongret |
| 4,251,234 | A | 2/1981 | Chang |
| 4,253,852 | A | 3/1981 | Adams |
| 4,259,093 | A | 3/1981 | Vlastos et al. |
| 4,259,452 | A | 3/1981 | Yukuta et al. |
| 4,259,707 | A | 3/1981 | Penney |
| 4,264,343 | A | 4/1981 | Natarajan et al. |
| 4,266,948 | A | 5/1981 | Teague et al. |
| 4,282,014 | A | 8/1981 | Winkler et al. |
| 4,284,420 | A | 8/1981 | Borysiak |
| 4,289,504 | A | 9/1981 | Scholes |
| 4,293,319 | A | 10/1981 | Claassen, Jr. |
| 4,308,036 | A | 12/1981 | Zahedi et al. |
| 4,315,188 | A | 2/1982 | Cerny et al. |
| 4,318,718 | A | 3/1982 | Utsumi et al. |
| 4,338,560 | A | 7/1982 | Lemley |
| 4,342,571 | A | 8/1982 | Hayashi |
| 4,349,359 | A | 9/1982 | Fitch et al. |
| 4,351,648 | A | 9/1982 | Penney |
| 4,354,861 | A | 10/1982 | Kalt |
| 4,357,150 | A | 11/1982 | Masuda et al. |
| 4,362,632 | A | 12/1982 | Jacob |
| 4,363,072 | A | 12/1982 | Coggins |
| 4,366,525 | A | 12/1982 | Baumgartner |
| 4,369,776 | A | 1/1983 | Roberts |
| 4,375,364 | A | 3/1983 | Van Hoesen et al. |
| 4,380,900 | A | 4/1983 | Linder et al. |
| 4,386,395 | A | 5/1983 | Francis, Jr. |
| 4,391,614 | A | 7/1983 | Rozmus |
| 4,394,239 | A | 7/1983 | Kitzelmann et al. |
| 4,405,342 | A | 9/1983 | Bergman |
| 4,406,671 | A | 9/1983 | Rozmus |
| 4,412,850 | A | 11/1983 | Kurata et al. |
| 4,413,225 | A | 11/1983 | Donig et al. |
| 4,414,603 | A | 11/1983 | Masuda |
| 4,435,190 | A | 3/1984 | Taillet et al. |
| 4,440,552 | A | 4/1984 | Uchiya et al. |
| 4,443,234 | A | 4/1984 | Carlsson |
| 4,445,911 | A | 5/1984 | Lind |
| 4,477,263 | A | 10/1984 | Shaver et al. |
| 4,477,268 | A | 10/1984 | Kalt |
| 4,481,017 | A | 11/1984 | Furlong |
| 4,496,375 | A | 1/1985 | Levantine |
| 4,502,002 | A | 2/1985 | Ando |
| 4,505,724 | A | 3/1985 | Baab |
| 4,509,958 | A | 4/1985 | Masuda et al. |
| 4,514,780 | A | 4/1985 | Brussee et al. |
| 4,515,982 | A | 5/1985 | Lechtken et al. |
| 4,516,991 | A | 5/1985 | Kawashima |
| 4,521,229 | A | 6/1985 | Baker et al. |
| 4,522,634 | A | 6/1985 | Frank |
| 4,534,776 | A | 8/1985 | Mammel et al. |
| 4,536,698 | A | 8/1985 | Shevalenko et al. |
| 4,544,382 | A | 10/1985 | Taillet et al. |
| 4,555,252 | A | 11/1985 | Eckstein |
| 4,569,684 | A | 2/1986 | Ibbott |
| 4,582,961 | A | 4/1986 | Frederiksen |
| 4,587,475 | A | 5/1986 | Finney, Jr. et al. |
| 4,588,423 | A | 5/1986 | Gillingham et al. |
| 4,590,042 | A | 5/1986 | Drage |
| 4,597,780 | A | 7/1986 | Reif |
| 4,597,781 | A | 7/1986 | Spector |
| 4,600,411 | A | 7/1986 | Santamaria |
| 4,601,733 | A | 7/1986 | Ordines et al. |
| 4,604,174 | A | 8/1986 | Bollinger et al. |
| 4,614,573 | A | 9/1986 | Masuda |
| 4,623,365 | A | 11/1986 | Bergman |
| 4,626,261 | A | 12/1986 | Jorgensen |
| 4,632,135 | A | 12/1986 | Lenting et al. |
| 4,632,746 | A | 12/1986 | Bergman |
| 4,636,981 | A | 1/1987 | Ogura |
| 4,643,744 | A | 2/1987 | Brooks |
| 4,643,745 | A | 2/1987 | Sakakibara et al. |
| 4,647,836 | A | 3/1987 | Olsen |
| 4,650,648 | A | 3/1987 | Beer et al. |
| 4,656,010 | A | 4/1987 | Leitzke et al. |
| 4,657,738 | A | 4/1987 | Kanter et al. |
| 4,659,342 | A | 4/1987 | Lind |
| 4,662,903 | A | 5/1987 | Yanagawa |
| 4,666,474 | A | 5/1987 | Cook |
| 4,668,479 | A | 5/1987 | Manabe et al. |
| 4,670,026 | A | 6/1987 | Hoenig |
| 4,673,416 | A | 6/1987 | Sakakibara et al. |
| 4,674,003 | A | 6/1987 | Zylka |
| 4,680,496 | A | 7/1987 | Letournel et al. |
| 4,686,370 | A | 8/1987 | Blach |
| 4,689,056 | A | 8/1987 | Noguchi et al. |
| 4,691,829 | A | 9/1987 | Auer |
| 4,692,174 | A | 9/1987 | Gelfand et al. |
| 4,693,869 | A | 9/1987 | Pfaff |
| 4,694,376 | A | 9/1987 | Gesslauer |
| 4,702,752 | A | 10/1987 | Yanagawa |
| 4,713,092 | A | 12/1987 | Kikuchi et al. |
| 4,713,093 | A | 12/1987 | Hansson |
| 4,713,724 | A | 12/1987 | Voelkel |
| 4,715,870 | A | 12/1987 | Masuda et al. |

| | | | | |
|---|---|---|---|---|
| 4,725,289 | A | | 2/1988 | Quintilian |
| 4,726,812 | A | | 2/1988 | Hirth |
| 4,726,814 | A | | 2/1988 | Weitman |
| 4,736,127 | A | | 4/1988 | Jacobsen |
| 4,743,275 | A | | 5/1988 | Flanagan |
| 4,749,390 | A | | 6/1988 | Burnett et al. |
| 4,750,921 | A | | 6/1988 | Sugita et al. |
| 4,760,302 | A | | 7/1988 | Jacobsen |
| 4,760,303 | A | | 7/1988 | Miyake |
| 4,765,802 | A | | 8/1988 | Gombos et al. |
| 4,771,361 | A | | 9/1988 | Varga |
| 4,772,297 | A | | 9/1988 | Anzai |
| 4,779,182 | A | | 10/1988 | Mickal et al. |
| 4,781,736 | A | | 11/1988 | Cheney et al. |
| 4,786,844 | A | | 11/1988 | Farrell et al. |
| 4,789,801 | A | | 12/1988 | Lee |
| 4,808,200 | A | | 2/1989 | Dallhammer et al. |
| 4,811,159 | A | | 3/1989 | Foster, Jr. |
| 4,822,381 | A | | 4/1989 | Mosley et al. |
| 4,853,005 | A | | 8/1989 | Jaisinghani et al. |
| 4,869,736 | A | | 9/1989 | Ivester et al. |
| 4,892,713 | A | | 1/1990 | Newman |
| 4,929,139 | A | | 5/1990 | Vorreiter et al. |
| 4,940,470 | A | | 7/1990 | Jaisinghani et al. |
| 4,940,894 | A | | 7/1990 | Morters |
| 4,941,068 | A | | 7/1990 | Hofmann |
| 4,941,224 | A | | 7/1990 | Saeki et al. |
| 4,944,778 | A | | 7/1990 | Yanagawa |
| 4,954,320 | A | | 9/1990 | Birmingham et al. |
| 4,955,991 | A | | 9/1990 | Torok et al. |
| 4,966,666 | A | | 10/1990 | Waltonen |
| 4,967,119 | A | | 10/1990 | Torok et al. |
| 4,976,752 | A | | 12/1990 | Torok et al. |
| 4,978,372 | A | | 12/1990 | Pick |
| D315,598 | S | | 3/1991 | Yamamoto et al. |
| 5,003,774 | A | | 4/1991 | Leonard |
| 5,006,761 | A | | 4/1991 | Torok et al. |
| 5,010,869 | A | | 4/1991 | Lee |
| 5,012,093 | A | | 4/1991 | Shimizu |
| 5,012,094 | A | | 4/1991 | Hamade |
| 5,012,159 | A | | 4/1991 | Torok et al. |
| 5,022,979 | A | | 6/1991 | Hijikata et al. |
| 5,024,685 | A | | 6/1991 | Torok et al. |
| 5,030,254 | A | | 7/1991 | Heyen et al. |
| 5,034,033 | A | | 7/1991 | Alsup, Jr. et al. |
| 5,037,456 | A | | 8/1991 | Yu |
| 5,045,095 | A | | 9/1991 | You |
| 5,053,912 | A | | 10/1991 | Loreth et al. |
| 5,059,219 | A | | 10/1991 | Plaks et al. |
| 5,061,462 | A | | 10/1991 | Suzuki |
| 5,066,313 | A | | 11/1991 | Mallory, Sr. |
| 5,072,746 | A | | 12/1991 | Kantor |
| 5,076,820 | A | | 12/1991 | Gurvitz |
| 5,077,468 | A | | 12/1991 | Hamade |
| 5,077,500 | A | | 12/1991 | Torok et al. |
| 5,100,440 | A | | 3/1992 | Stahel et al. |
| RE33,927 | E | | 5/1992 | Fuzimura |
| D326,514 | S | | 5/1992 | Alsup et al. |
| 5,118,942 | A | | 6/1992 | Hamade |
| 5,125,936 | A | | 6/1992 | Johansson |
| 5,136,461 | A | | 8/1992 | Zellweger |
| 5,137,546 | A | | 8/1992 | Steinbacher et al. |
| 5,141,529 | A | | 8/1992 | Oakley et al. |
| 5,141,715 | A | | 8/1992 | Sackinger et al. |
| D329,284 | S | | 9/1992 | Patton |
| 5,147,429 | A | | 9/1992 | Bartholomew et al. |
| 5,154,733 | A | | 10/1992 | Fujii et al. |
| 5,158,580 | A | | 10/1992 | Chang |
| D332,655 | S | | 1/1993 | Lytle et al. |
| 5,180,404 | A | | 1/1993 | Loreth et al. |
| 5,183,480 | A | | 2/1993 | Raterman et al. |
| 5,196,171 | A | | 3/1993 | Peltier |
| 5,198,003 | A | | 3/1993 | Haynes |
| 5,199,257 | A | | 4/1993 | Colletta et al. |
| 5,210,678 | A | | 5/1993 | Lain et al. |
| 5,215,558 | A | | 6/1993 | Moon |
| 5,217,504 | A | | 6/1993 | Johansson |
| 5,217,511 | A | | 6/1993 | Plaks et al. |
| 5,234,555 | A | | 8/1993 | Ibbott |
| 5,248,324 | A | | 9/1993 | Hara |
| 5,250,267 | A | | 10/1993 | Johnson et al. |
| 5,254,155 | A | | 10/1993 | Mensi |
| 5,266,004 | A | | 11/1993 | Tsumurai et al. |
| 5,271,763 | A | | 12/1993 | Jang |
| 5,282,891 | A | | 2/1994 | Durham |
| 5,290,343 | A | | 3/1994 | Morita et al. |
| 5,296,019 | A | | 3/1994 | Oakley et al. |
| 5,302,190 | A | | 4/1994 | Williams |
| 5,308,586 | A | | 5/1994 | Fritsche et al. |
| 5,315,838 | A | | 5/1994 | Thompson |
| 5,316,741 | A | | 5/1994 | Sewell et al. |
| 5,330,559 | A | | 7/1994 | Cheney et al. |
| 5,348,571 | A | | 9/1994 | Weber |
| 5,376,168 | A | | 12/1994 | Inculet |
| 5,378,978 | A | | 1/1995 | Gallo et al. |
| 5,386,839 | A | | 2/1995 | Chen |
| 5,395,430 | A | | 3/1995 | Lundgren et al. |
| 5,401,301 | A | | 3/1995 | Schulmerich et al. |
| 5,401,302 | A | | 3/1995 | Schulmerich et al. |
| 5,403,383 | A | | 4/1995 | Jaisinghani |
| 5,405,434 | A | | 4/1995 | Inculet |
| 5,407,469 | A | | 4/1995 | Sun |
| 5,407,639 | A | | 4/1995 | Watanabe et al. |
| 5,412,213 | A | * | 5/1995 | Kido et al. .................. 250/326 |
| 5,417,936 | A | | 5/1995 | Suzuki et al. |
| 5,419,953 | A | | 5/1995 | Chapman |
| 5,433,772 | A | | 7/1995 | Sikora |
| 5,435,817 | A | | 7/1995 | Davis et al. |
| 5,435,978 | A | | 7/1995 | Yokomi |
| 5,437,713 | A | | 8/1995 | Chang |
| 5,437,843 | A | | 8/1995 | Kuan |
| 5,445,798 | A | | 8/1995 | Ikeda et al. |
| 5,466,279 | A | | 11/1995 | Hattori et al. |
| 5,468,454 | A | | 11/1995 | Kim |
| 5,474,599 | A | | 12/1995 | Cheney et al. |
| 5,484,472 | A | | 1/1996 | Weinberg |
| 5,484,473 | A | | 1/1996 | Bontempi |
| 5,492,678 | A | | 2/1996 | Ota et al. |
| 5,501,844 | A | | 3/1996 | Kasting, Jr. et al. |
| 5,503,808 | A | | 4/1996 | Garbutt et al. |
| 5,503,809 | A | | 4/1996 | Coate et al. |
| 5,505,914 | A | | 4/1996 | Tona-Serra |
| 5,508,008 | A | | 4/1996 | Wasser |
| 5,514,345 | A | | 5/1996 | Garbutt et al. |
| 5,516,493 | A | | 5/1996 | Bell et al. |
| 5,518,531 | A | | 5/1996 | Joannu |
| 5,520,887 | A | | 5/1996 | Shimizu et al. |
| 5,525,310 | A | | 6/1996 | Decker et al. |
| 5,529,613 | A | | 6/1996 | Yavnieli |
| 5,529,760 | A | | 6/1996 | Burris |
| 5,532,798 | A | | 7/1996 | Nakagami et al. |
| 5,535,089 | A | | 7/1996 | Ford et al. |
| 5,536,477 | A | | 7/1996 | Cha et al. |
| 5,538,695 | A | | 7/1996 | Shinjo et al. |
| 5,540,761 | A | | 7/1996 | Yamamoto |
| 5,542,967 | A | | 8/1996 | Ponizovsky et al. |
| 5,545,379 | A | | 8/1996 | Gray |
| 5,545,380 | A | | 8/1996 | Gray |
| 5,547,643 | A | | 8/1996 | Nomoto et al. |
| 5,549,874 | A | | 8/1996 | Kamiya et al. |
| 5,554,344 | A | | 9/1996 | Duarte |
| 5,554,345 | A | | 9/1996 | Kitchenman |
| 5,565,685 | A | | 10/1996 | Czako et al. |
| 5,569,368 | A | | 10/1996 | Larsky et al. |
| 5,569,437 | A | | 10/1996 | Stiehl et al. |
| D375,546 | S | | 11/1996 | Lee |

5,571,483 A 11/1996 Pfingstl et al.
5,573,577 A 11/1996 Joannou
5,573,730 A 11/1996 Gillum
5,578,112 A 11/1996 Krause
5,578,280 A 11/1996 Kazi et al.
5,582,632 A 12/1996 Nohr et al.
5,587,131 A 12/1996 Malkin et al.
D377,523 S 1/1997 Marvin et al.
5,591,253 A 1/1997 Altman et al.
5,591,334 A 1/1997 Shimizu et al.
5,591,412 A 1/1997 Jones et al.
5,593,476 A 1/1997 Coppom
5,601,636 A 2/1997 Glucksman
5,603,752 A 2/1997 Hara
5,603,893 A 2/1997 Gundersen et al.
5,614,002 A 3/1997 Chen
5,624,476 A 4/1997 Eyraud
5,630,866 A 5/1997 Gregg
5,630,990 A 5/1997 Conrad et al.
5,637,198 A 6/1997 Breault
5,637,279 A 6/1997 Besen et al.
5,641,342 A 6/1997 Smith et al.
5,641,461 A 6/1997 Ferone
5,647,890 A 7/1997 Yamamoto
5,648,049 A 7/1997 Jones et al.
5,655,210 A 8/1997 Gregoire et al.
5,656,063 A 8/1997 Hsu
5,665,147 A 9/1997 Taylor et al.
5,667,563 A 9/1997 Silva, Jr.
5,667,564 A 9/1997 Weinberg
5,667,565 A 9/1997 Gondar
5,667,756 A 9/1997 Ho
5,669,963 A 9/1997 Horton et al.
5,678,237 A 10/1997 Powell et al.
5,681,434 A 10/1997 Eastlund
5,681,533 A 10/1997 Hiromi
5,698,164 A 12/1997 Kishioka et al.
5,702,507 A 12/1997 Wang
D389,567 S 1/1998 Gudefin
5,766,318 A 6/1998 Loreth et al.
5,779,769 A 7/1998 Jiang
5,785,631 A 7/1998 Heidecke
5,814,135 A 9/1998 Weinberg
5,879,435 A 3/1999 Satyapal et al.
5,893,977 A 4/1999 Pucci
D409,388 S 5/1999 Pinchuk
D410,540 S 6/1999 Pinchuk
D411,001 S 6/1999 Pinchuk
5,911,957 A 6/1999 Khatchatrian et al.
5,972,076 A 10/1999 Nichols et al.
5,975,090 A 11/1999 Taylor et al.
5,980,614 A 11/1999 Loreth et al.
5,993,521 A 11/1999 Loreth et al.
5,993,738 A 11/1999 Goswani
5,997,619 A 12/1999 Knuth et al.
D420,438 S 2/2000 Pinchuk
6,019,815 A 2/2000 Satyapal et al.
6,042,637 A 3/2000 Weinberg
6,063,168 A 5/2000 Nichols et al.
D427,300 S 6/2000 Pinchuk
6,086,657 A 7/2000 Freije
6,090,189 A 7/2000 Wikström et al.
6,117,216 A 9/2000 Loreth
6,118,645 A 9/2000 Partridge
6,126,722 A 10/2000 Mitchell et al.
6,126,727 A 10/2000 Lo
D433,494 S 11/2000 Pinchuk et al.
D434,209 S 11/2000 McKinney
D434,483 S 11/2000 Pinchuk
6,149,717 A 11/2000 Satyapal et al.
6,149,815 A 11/2000 Sauter
6,152,146 A 11/2000 Taylor et al.
6,163,098 A 12/2000 Taylor et al.
6,176,977 B1 1/2001 Taylor et al.
6,182,461 B1 2/2001 Washburn et al.
6,182,671 B1 2/2001 Taylor et al.
6,187,271 B1 2/2001 Lee et al.
6,193,852 B1 2/2001 Caracciolo et al.
6,203,600 B1 3/2001 Loreth
D440,290 S 4/2001 Pinchuk
6,212,883 B1 4/2001 Kang
6,228,149 B1 5/2001 Alenichev et al.
6,251,171 B1 6/2001 Marra et al.
6,252,012 B1 6/2001 Egitto et al.
6,270,733 B1 8/2001 Rodden
6,277,248 B1 8/2001 Ishioka et al.
6,282,106 B2 8/2001 Grass
D449,097 S 10/2001 Smith et al.
D449,679 S 10/2001 Smith et al.
6,296,692 B1 10/2001 Gutmann
6,302,944 B1 10/2001 Hoenig
6,309,514 B1 10/2001 Conrad et al.
6,312,507 B1 11/2001 Taylor et al.
6,315,821 B1 11/2001 Pillion et al.
6,328,791 B1 12/2001 Pillion et al.
6,348,103 B1 2/2002 Ahlborn et al.
6,350,417 B1 2/2002 Lau et al.
D454,627 S 3/2002 Pinchuk
6,362,604 B1 3/2002 Cravey
6,372,097 B1 4/2002 Chen
6,373,723 B1 4/2002 Wallgren et al.
6,379,427 B1 4/2002 Siess
6,391,259 B1 5/2002 Malkin et al.
6,393,718 B1 5/2002 Harris et al.
6,398,852 B1 6/2002 Loreth
D461,002 S 7/2002 Christianson
D462,430 S 9/2002 Christianson
6,447,587 B1 9/2002 Pillion et al.
6,451,266 B1 9/2002 Lau et al.
6,464,754 B1 10/2002 Ford
6,471,753 B1 10/2002 Ahn et al.
6,494,940 B1 12/2002 Hak
6,497,754 B2 12/2002 Joannou
6,504,308 B1 1/2003 Krichtafovitch et al.
6,506,238 B1 1/2003 Endo
6,508,982 B1 1/2003 Shoji
6,516,223 B2 * 2/2003 Hofmann .................... 604/21
D472,968 S 4/2003 Christianson
6,544,485 B1 4/2003 Taylor
6,576,046 B2 6/2003 Pruette et al.
6,585,935 B1 7/2003 Taylor et al.
6,588,434 B2 7/2003 Taylor et al.
6,603,268 B2 8/2003 Lee
6,613,277 B1 9/2003 Monagan
6,632,407 B1 10/2003 Lau et al.
6,635,105 B2 10/2003 Ahlborn et al.
6,635,106 B2 * 10/2003 Katou et al. .................. 96/67
6,640,049 B1 10/2003 Lee et al.
6,672,315 B2 1/2004 Taylor et al.
6,680,028 B1 1/2004 Harris
6,709,484 B2 3/2004 Lau et al.
6,713,026 B2 3/2004 Taylor et al.
6,735,830 B1 5/2004 Merciel
D491,654 S 6/2004 Gatchell et al.
6,749,667 B2 6/2004 Reeves et al.
6,753,652 B2 6/2004 Kim
6,761,796 B2 7/2004 Srivastava et al.
6,768,108 B2 7/2004 Hirano et al.
6,768,110 B2 7/2004 Alani
6,768,120 B2 7/2004 Leung et al.
6,768,121 B2 7/2004 Horsky et al.
D495,043 S 8/2004 Gatchell et al.
6,770,878 B2 8/2004 Uhlemann et al.
6,774,359 B1 8/2004 Hirabayashi et al.
6,777,686 B2 8/2004 Olson et al.
6,777,699 B1 8/2004 Miley et al.

| | | | |
|---|---|---|---|
| 6,777,882 | B2 | 8/2004 | Goldberg et al. |
| 6,781,136 | B1 | 8/2004 | Kato |
| 6,785,912 | B1 | 9/2004 | Julio |
| 6,791,814 | B2 | 9/2004 | Adachi et al. |
| 6,794,661 | B2 | 9/2004 | Tsukihara et al. |
| 6,797,339 | B2 | 9/2004 | Akizuki et al. |
| 6,797,964 | B2 | 9/2004 | Yamashita |
| 6,799,068 | B1 | 9/2004 | Hartmann et al. |
| 6,800,862 | B2 | 10/2004 | Matsumoto et al. |
| 6,803,585 | B2 | 10/2004 | Glukhoy |
| 6,805,916 | B2 | 10/2004 | Cadieu |
| 6,806,035 | B1 | 10/2004 | Atireklapvarodom et al. |
| 6,806,163 | B2 | 10/2004 | Wu et al. |
| 6,806,468 | B2 | 10/2004 | Laiko et al. |
| 6,808,606 | B2 | 10/2004 | Thomsen et al. |
| 6,809,310 | B2 | 10/2004 | Chen |
| 6,809,312 | B1 | 10/2004 | Park et al. |
| 6,809,325 | B2 | 10/2004 | Dahl et al. |
| D497,985 | S | 11/2004 | Christianson |
| 6,812,647 | B2 | 11/2004 | Cornelius |
| 6,815,690 | B2 | 11/2004 | Veerasamy et al. |
| 6,818,257 | B2 | 11/2004 | Amann et al. |
| 6,818,909 | B2 | 11/2004 | Murrell et al. |
| 6,819,053 | B2 | 11/2004 | Johnson |
| 6,827,088 | B2 | 12/2004 | Taylor et al. |
| 6,863,869 | B2 | 3/2005 | Lau et al. |
| 6,893,618 | B2 | 5/2005 | Kotlyar et al. |
| 6,896,853 | B2 | 5/2005 | Lau et al. |
| 6,897,617 | B2 | 5/2005 | Lee |
| 6,899,745 | B2 | 5/2005 | Gatchell et al. |
| D506,000 | S | 6/2005 | Christianson |
| D506,001 | S | 6/2005 | Christianson |
| D506,030 | S | 6/2005 | Lai |
| D506,249 | S | 6/2005 | Christianson |
| D506,538 | S | 6/2005 | Christianson |
| 6,908,501 | B2 | 6/2005 | Reeves et al. |
| 6,911,186 | B2 | 6/2005 | Taylor et al. |
| 6,953,556 | B2 | 10/2005 | Taylor et al. |
| 6,958,134 | B2 | 10/2005 | Taylor et al. |
| 6,972,057 | B2 | 12/2005 | Lau et al. |
| 6,974,560 | B2 | 12/2005 | Taylor et al. |
| D514,127 | S | 1/2006 | Christianson |
| 6,984,987 | B2 | 1/2006 | Taylor et al. |
| D517,182 | S | 3/2006 | Christianson |
| 7,014,686 | B2 | 3/2006 | Gatchell et al. |
| 7,056,370 | B2 | 6/2006 | Reeves et al. |
| D526,397 | S | 8/2006 | Christianson |
| D526,398 | S | 8/2006 | Christianson |
| D527,087 | S | 8/2006 | Christianson |
| 7,097,695 | B2 | 8/2006 | Lau et al. |
| D542,901 | S | 5/2007 | Christianson |
| 7,220,295 | B2 | 5/2007 | Lau et al. |
| D548,824 | S | 8/2007 | Christianson |
| 2001/0048906 | A1 | 12/2001 | Lau et al. |
| 2002/0079212 | A1 | 6/2002 | Taylor et al. |
| 2002/0098131 | A1 | 7/2002 | Taylor et al. |
| 2002/0122751 | A1 | 9/2002 | Sinaiko et al. |
| 2002/0127156 | A1 | 9/2002 | Taylor |
| 2002/0134665 | A1 | 9/2002 | Taylor et al. |
| 2002/0144601 | A1 | 10/2002 | Palestro et al. |
| 2002/0146356 | A1 | 10/2002 | Sinaiko et al. |
| 2002/0150520 | A1 | 10/2002 | Taylor et al. |
| 2002/0152890 | A1 | 10/2002 | Leiser |
| 2002/0155041 | A1 | 10/2002 | McKinney, Jr. et al. |
| 2002/0190658 | A1 | 12/2002 | Lee |
| 2002/0195951 | A1 | 12/2002 | Lee |
| 2003/0170150 | A1 | 9/2003 | Law et al. |
| 2003/0206837 | A1 | 11/2003 | Taylor et al. |
| 2003/0209420 | A1 | 11/2003 | Taylor et al. |
| 2004/0033176 | A1 | 2/2004 | Lee et al. |
| 2004/0079233 | A1 | 4/2004 | Lau et al. |
| 2004/0096376 | A1 | 5/2004 | Taylor |
| 2004/0136863 | A1 | 7/2004 | Yates et al. |
| 2004/0166037 | A1 | 8/2004 | Youdell et al. |
| 2004/0170542 | A1 | 9/2004 | Taylor |
| 2004/0202547 | A1 | 10/2004 | Taylor et al. |
| 2004/0226447 | A1 | 11/2004 | Lau et al. |
| 2004/0234431 | A1 | 11/2004 | Taylor et al. |
| 2004/0251124 | A1 | 12/2004 | Lau |
| 2005/0000793 | A1 | 1/2005 | Taylor et al. |
| 2005/0095182 | A1 | 5/2005 | Lee |
| 2005/0147545 | A1 | 7/2005 | Lau et al. |
| 2005/0152818 | A1 | 7/2005 | Botvinnik et al. |
| 2005/0158219 | A1 | 7/2005 | Taylor et al. |
| 2005/0183576 | A1 | 8/2005 | Taylor et al. |
| 2005/0194246 | A1 | 9/2005 | Botvinnik et al. |
| 2005/0194583 | A1 | 9/2005 | Taylor et al. |
| 2005/0210902 | A1 | 9/2005 | Parker et al. |
| 2005/0232831 | A1 | 10/2005 | Taylor et al. |
| 2005/0238551 | A1 | 10/2005 | Snyder et al. |
| 2006/0018076 | A1 | 1/2006 | Taylor et al. |
| 2006/0018811 | A1 | 1/2006 | Taylor et al. |
| 2006/0018812 | A1 | 1/2006 | Taylor et al. |
| 2006/0021509 | A1 | 2/2006 | Taylor et al. |
| 2006/0159594 | A1 | 7/2006 | Parker et al. |
| 2006/0203416 | A1 | 9/2006 | Taylor et al. |
| 2007/0009406 | A1 | 1/2007 | Taylor et al. |
| 2007/0148061 | A1 | 6/2007 | Lau et al. |
| 2007/0210734 | A1 | 9/2007 | Botvinnik et al. |

FOREIGN PATENT DOCUMENTS

| | | | |
|---|---|---|---|
| CN | 1232200 | C | 7/2002 |
| DE | 2206057 | | 8/1973 |
| DE | 197 41 621 | C1 | 6/1999 |
| EP | 0433152 | A1 | 12/1990 |
| EP | 0332624 | B1 | 1/1992 |
| EP | 00157581-0001 | | 6/2004 |
| FR | 2690509 | | 10/1993 |
| GB | 643363 | | 9/1950 |
| HK | 1044365 | | 10/2002 |
| HK | 0410006.9 | | 2/2004 |
| HK | 0500059.9 | | 2/2005 |
| JP | S63-164948 | | 7/1988 |
| JP | S51-90077 | | 7/1993 |
| JP | S62-20653 | | 9/1994 |
| JP | 10137007 | | 5/1998 |
| JP | 11104223 | | 4/1999 |
| JP | 2000236914 | | 9/2000 |
| KR | 0364082 | | 10/2004 |
| WO | WO 92/05875 | A1 | 4/1992 |
| WO | WO 96/04703 | A1 | 2/1996 |
| WO | WO 99/07474 | A1 | 2/1999 |
| WO | WO 00/10713 | A1 | 3/2000 |
| WO | WO 01/47803 | A1 | 7/2001 |
| WO | WO 01/48781 | A1 | 7/2001 |
| WO | WO 01/64349 | A1 | 9/2001 |
| WO | WO 01/85348 | A2 | 11/2001 |
| WO | WO 02/20162 | A2 | 3/2002 |
| WO | WO 02/20163 | A2 | 3/2002 |
| WO | WO 02/30574 | A1 | 4/2002 |
| WO | WO 02/32578 | A1 | 4/2002 |
| WO | WO 02/42003 | A1 | 5/2002 |
| WO | WO 02/066167 | A1 | 8/2002 |
| WO | WO 03/009944 | A1 | 2/2003 |
| WO | WO 03/013620 | A1 | 2/2003 |
| WO | WO 03/013734 AA | | 2/2003 |
| WO | WO 2006/060741 | | 6/2006 |

OTHER PUBLICATIONS

2003, Honeywell Enviracaire 275, Honeywell, Dec. or earlier.
Kenmore Progressive 335, Kenmore, Dec. 2003, or earlier.
Radio Shack Honeywell Environizer, Honeywell, Oct. 2002, or earlier.
Brookstone ESP, Brookstone, Dec. 2003, or earlier.
Hoover SilentAir, Hoover, Nov. 2003, or earlier.

Air-O-Swiss AOS 2055D Cool Mist Air Washer, Air-O-Swiss, Jan. 2006, or earlier.
Austin Air Allergy Machine Air Filter, Austin Air, Jan. 2006, or earlier.
Sila Plug-In Air Purifier/Deodorizer, Lentek, Dec. 1999, or earlier.
PERMAtech Ionizing Air Cleaner, Bionaire, Mar. 9, 2007, or earlier.
99% HEPA Air Cleaner, Bionaire, Mar. 9, 2007, or earlier.
Air Exchange Delivery System, Bionaire, Mar. 9, 2007, or earlier.
Purif-Ion ICP-250, Purif-Ion, Dec. 2004, or earlier.
Air Cleaner, Electrolux, Mar. 9, 2007, or earlier.
Ionic Tower UV Silent Air Purifier Germicidal Protection, Fresh Air Express, Aug. 2005, or earlier.
Surround Air Ionic Air Purifier, Surround Air, Nov. 2003, or earlier.
LifeWise Ultra Air Purifier, LifeWise, Apr. 29, 2004.
Neo-Tec Air Purifier with Anion Generator, Neo-Tec, Nov. 2003, or earlier.
Eco Quest Living Air Purifier, EcoQuest, Aug. 2002, or earlier.
Anion Cool Fan, Mar. 9, 2007, or earlier.
Moonland Air Purifier, Moonland, Mar. 9, 2007, or earlier.
Moonland Aroma Oxygen Generator, Moonland, Feb. 18, 2006.
Surround Air Ionic Air Purifier, Surround Air, Dec. 2004, or earlier.
Air Innovations Ionic Air Freshener, Air Innovations, Jun. 13, 2003.
Ionic Pet Brush, Mar. 9, 2007, or earlier.
Neo-Tec Air Freshener with Light, Neo-Tec, Jun. 13, 2003.
Enviracaire IFD Air Purifier, Enviracaire, Dec. 2003, or earlier.
Leadtek Ionic Air Purifier, Leadtek, Mar. 9, 2007, or earlier.
Nouveau Enviracaire Air Purifier, Nouveau, Dec. 2003, or earlier.
Ionic Pro Mini Ionic Air Purifier, Ionic Pro, Dec. 2006, or earlier.
LifeWise Ultra Electronic Air Purifier, LifeWise, Dec. 2005, or earlier.
Surround Air Air Purifier with Anion Generator, Surround Air, Nov. 2003, or earlier.
Ionic Pro Ionic Air Purifier, Ionic Pro, Dec. 2005, or earlier.
Ionic Pro Ionic Air Purifier, Ionic Pro, Dec. 2006, or earlier.
Neo-Tec Ionic Air Purification System, Neo-Tec, Jun. 13, 2003.
Jenn-Air Air Purifier, Jenn-Air, Dec. 1996, or earlier.
P3 Direct IonizAir, P3 Direct, Mar. 9, 2007, or earlier.
Honeywell Environizer, Honeywell, Dec. 2002, or earlier.
SABA Air Purifier, SABA, Mar. 9, 2007, or earlier.
Anion Air Purifier, Anion, Mar. 9, 2007, or earlier.
Brookstone Pure Ion Travel, Brookstone, Dec. 2003, or earlier.
Sharper Image Ionic Breeze Air Freshener, Sharper Image Corporation, Nov. 2004, or earlier.
Oreck Ionic Freshener with Light, Oreck, Mar. 31, 2005.
Neo-Tech Air Purifier with Anion Generator, Neo-Tec, Jun. 13, 2003.
Neo-Tec Professional Ionic Cleaner, Neo-Tec, Jun. 16, 2003.
Lumipure Air Purifier with Permanent Filtration, Lumipure, Mar. 9, 2007, or earlier.
LifeWise Electronic Air Purifier, LifeWise, Dec. 2004, or earlier.
Trion Console 250 Electronic Air Cleaner, Trion, Apr. 28, 2004.
Brookstone Pure Ion UV Air Purifier, Brookstone, Dec. 2004, or earlier.
Silent Air Purifier, Mar. 9, 2007, or earlier.
Ionic Pro Turbo Ionic Air Purifier, Ionic Pro, Dec. 2006, or earlier.
TheraPure Fan with UV Germicidal Light, TheraPure, Dec. 2006, or earlier.
Oreck XL Professional Air Purifier, Oreck, Dec. 2006, or earlier.
MKS Ion Systems Analog Ceiling Emitter Ionizer, MKS Ion Systems, Dec. 2006, or earlier.
Blueair AV 402 Air Purifier, Blueair, Dec. 1996, or earlier.
Blueair AV 501 Air Purifier, Blueair, Dec. 1997, or earlier.
"Air Cleaners: Behind the Hype," Oct. 2003.
Electrical schematic and promotional material, Zenion Industries, Aug. 1990.
Friedrich C-90A Electronic Air Cleaner, Friedrich Air Conditioning Co., Dec. 1995, or earlier.
Friedrich C-90A, "How the C-90A Works," Friedrich Air Conditioning Co., Dec. 1995, or earlier.
"Household Air Cleaners," Oct. 1992.
LakeAir Excel and Maxum Portable Electronic Air Cleaners, LakeAir International, Inc., Dec. 1971, or earlier.
Promotional material available from Zenion Industries for the Plasma-Pure 100/200/300, Zenion Industries, Aug. 1990, or earlier.
Promotional material available from Zenion Industries for the Plasma-Tron, Zenion Industries, Aug. 1990, or earlier.
Trion 120 Air Purifier, Model 442501-025, Trion, Special IDS Transmital—See Notes.
Trion 150 Air Purifier, Model 45000-002, Trion, Special IDS Transmital—See Notes.
Trion 350 Air Purifier, Model 45011-010, Trion, Special IDS Transmital—See Notes.
Trion Console 250 Electronic Air Cleaner, Model Series 442857 and 445600, Trion, Special IDS Transmital—See Notes.
"Zenion Elf Device," drawing, prior art, Aug. 2, 2000.
Lentek Sila™ Plug-In Air Purifier/Deodorizer product box, Lentek, Dec. 1999, or earlier.
"Ionic Sensor Touch™ Hair Dryer," Oct. 27, 2000.
"Ionic Hair Brush," Oct. 27, 2000.
"Ionic Lint Brush," Oct. 27, 2000.
"Ionic Garment Deodorizer," Oct. 27, 2000.
"Auto Ionizer," Oct. 27, 2000.
Jewell-Larsen, N. E., "Optimization and Miniaturization of Electrostatic Air Pumps for Thermal Management," Master thesis, University of Washington, 2004, 130 pages.

* cited by examiner

PRIOR ART WIRE EMITTER

STRIP EMITTER ELECTRODE

EMITTER ELECTRODE HAVING A STRIP SHAPE

PRIORITY CLAIM

This application is a continuation in part of U.S. patent application Ser. No. 11/007,734, filed Dec. 8, 2004, now U.S. Pat. No. 7,517,505, which is a continuation of U.S. patent application Ser. No. 10/717,420, filed Nov. 19, 2003, now abandoned, which claimed priority to U.S. Provisional Patent Application No. 60/500,437, filed Sep. 5, 2003, now expired, all of which are fully incorporated herein by reference. This application is also a continuation in part of U.S. patent application No. 10/791,561, filed Mar. 2, 2004, now U.S. Pat. No. 7,517,503.

CROSS REFERENCE TO RELATED APPLICATIONS

This application relates to the following commonly-owned co-pending patent applications:

| U.S. Patent application Ser. No. | Filed |
|---|---|
| 90/007,276 | Oct. 29, 2004 |
| 11/041,926 | Jan. 21, 2005 |
| 11/091,243 | Mar. 28, 2005 |
| 11/062,057 | Feb. 18, 2005 |
| 11/071,779 | Mar. 3, 2005 |
| 10/994,869 | Nov. 22, 2004 |
| 11/007,556 | Dec. 8, 2004 |
| 10/074,209 | Feb. 12, 2002 |
| 10/685,182 | Oct. 14, 2003 |
| 10/944,016 | Sep. 17, 2004 |
| 10/795,934 | Mar. 8, 2004 |
| 10/435,289 | May 9, 2003 |
| 11/064,797 | Feb. 24, 2005 |
| 11/003,671 | Dec. 3, 2004 |
| 11/003,035 | Dec. 3, 2004 |
| 11/007,395 | Dec. 8, 2004 |
| 10/876,495 | Jun. 25, 2004 |
| 10/809,923 | Mar. 25, 2004 |
| 11/004,397 | Dec. 3, 2004 |
| 10/895,799 | Jul. 21, 2004 |
| 10/642,927 | Aug. 18, 2003 |
| 11/823,346 | Apr. 12, 2004 |
| 10/662,591 | Sep. 15, 2003 |
| 11/061,967 | Feb. 18, 2005 |
| 11/150,046 | Jun. 10, 2005 |
| 11/188,448 | Jul. 25, 2005 |
| 11/188,478 | Jul. 25, 2005 |
| 11/293,538 | Dec. 2, 2005 |
| 11/457,396 | Jul. 13, 2006 |
| 11/464,139 | Aug. 11, 2006 |
| 11/694,281 | Mar. 30, 2007 |

INCORPORATION BY REFERENCE

The contents of the following patent applications and issued patents are fully incorporated herein by reference:

| U.S. Patent application Ser. No. | Filed | U.S. Pat. No. |
|---|---|---|
| 90/007,276 | Oct. 29, 2004 | |
| 09/419,720 | Oct. 14, 1999 | 6,504,308 |
| 11/041,926 | Jan. 21, 2005 | |
| 09/231,917 | Jan. 14, 1999 | 6,125,636 |
| 11/091,243 | Mar. 28, 2005 | |
| 10/978,891 | Nov. 1, 2004 | |
| 11/087,969 | Mar. 23, 2005 | 7,056,370 |
| 09/197,131 | Nov. 20, 1998 | 6,585,935 |
| 08/924,580 | Sep. 5, 1997 | 5,802,865 |
| 09/148,843 | Sep. 4, 1998 | 6,189,327 |
| 09/232,196 | Jan. 14, 1999 | 6,163,098 |
| 10/454,132 | Jun. 4, 2003 | 6,827,088 |
| 09/721,055 | Nov. 22, 2000 | 6,640,049 |
| 10/405,193 | Apr. 1, 2003 | |
| 09/669,253 | Sep. 25, 2000 | 6,632,407 |
| 09/249,375 | Feb. 12, 1999 | 6,312,507 |
| 09/742,814 | Dec. 19, 2000 | 6,672,315 |
| 09/415,576 | Oct. 8, 1999 | 6,182,671 |
| 09/344,516 | Jun. 25, 1999 | 6,152,146 |
| 09/163,024 | Sep. 29, 1998 | 5,975,090 |
| 11/062,057 | Feb. 18, 2005 | |
| 10/188,668 | Jul. 2, 2002 | 6,588,434 |
| 10/815,230 | Mar. 30, 2004 | 6,953,556 |
| 11/003,516 | Dec. 3, 2004 | |
| 11/071,779 | Mar. 3, 2005 | |
| 10/994,869 | Nov. 22, 2004 | |
| 11/007,556 | Dec. 8, 2004 | |
| 11/003,894 | Dec. 3, 2004 | |
| 10/661,988 | Sep. 12, 2003 | 7,097,695 |
| 10/774,579 | Feb. 9, 2004 | 7,077,890 |
| 09/730,499 | Dec. 5, 2000 | 6,713,026 |
| 10/156,158 | May 28, 2002 | 6,863,869 |
| 09/186,471 | Nov. 5, 1998 | 6,176,977 |
| 11/003,752 | Dec. 3, 2004 | |
| 10/835,743 | Apr. 30, 2004 | 6,908,501 |
| 10/791,561 | Mar. 2, 2004 | |
| 10/658,721 | Sep. 9, 2003 | 6,896,853 |
| 11/006,344 | Dec. 7, 2004 | |
| 10/074,209 | Feb. 12, 2002 | |
| 10/023,460 | Dec. 13, 2001 | |
| 10/379,966 | Mar. 5, 2003 | |
| 10/685,182 | Oct. 14, 2003 | |
| 10/944,016 | Sep. 17, 2004 | |
| 10/074,096 | Feb. 12, 2002 | 6,974,560 |
| 10/074,347 | Feb. 12, 2002 | 6,911,186 |
| 10/795,934 | Mar. 8, 2004 | |
| 10/435,289 | May 9, 2003 | |
| 09/774,198 | Jan. 29, 2001 | 6,544,485 |
| 11/064,797 | Feb. 24, 2005 | |
| 11/003,034 | Dec. 3, 2004 | |
| 11/003,671 | Dec. 3, 2004 | |
| 11/003,035 | Dec. 3, 2004 | |
| 11/007,395 | Dec. 8, 2004 | |
| 10/074,827 | Feb. 12, 2002 | |
| 10/876,495 | Jun. 25, 2004 | |
| 10/809,923 | Mar. 25, 2004 | |
| 11/062,173 | Feb. 18, 2005 | |
| 10/074,082 | Feb. 12, 2002 | 6,958,134 |
| 10/278,193 | Oct. 21, 2002 | 6,749,667 |
| 09/924,600 | Aug. 8, 2001 | 6,709,484 |
| 09/564,960 | May 4, 2000 | 6,350,417 |
| 10/806,293 | Mar. 22, 2004 | 6,972,057 |
| 11/004,397 | Dec. 3, 2004 | |
| 10/895,799 | Jul. 21, 2004 | |
| 10/625,401 | Jul. 23, 2003 | 6,984,987 |
| 10/642,927 | Aug. 18, 2003 | |
| 11/823,346 | Apr. 12, 2004 | |
| 10/662,591 | Sep. 15, 2003 | |
| 11/061,967 | Feb. 18, 2005 | |
| 11/150,046 | Jun. 10, 2005 | |
| 11/188,448 | Jul. 25, 2005 | |
| 11/188,478 | Jul. 25, 2005 | |
| 60/777,943 | Feb. 25, 2006 | |
| 11/293,538 | Dec. 2, 2005 | |
| 11/338,974 | Jan. 25, 2006 | |
| 10/794,526 | Mar. 4, 2004 | 7,014,686 |
| 10/267,006 | Oct. 8, 2002 | 6,899,745 |
| 11/457,396 | Jul. 13, 2006 | |
| 11/464,139 | Aug. 11, 2006 | |
| 10/168,723 | Jun. 21, 2002 | 6,897,617 |
| 10/168,724 | Jun. 21, 2002 | 6,603,268 |

BACKGROUND

Existing wire emitter electrodes (referred to as "Prior Art Wire Emitter(s)") ionize the air and generate corona discharge at levels proportionate to the current running through the electrode. Such electrodes are operatively coupled to a voltage supply which enables such current flow. The amount of ionized particles and corona discharge generated is a function of the emitter current. The higher the emitter current, the more air is ionized and the greater the corona discharge.

Ozone production can be a byproduct of corona discharge if certain conditions are present. This ionization process can cause oxygen molecules ($O_2$) to split in the air. The split molecules seek stability and attach themselves to other oxygen molecules ($O_2$), forming ozone ($O_3$). Inhaling excess amounts of ozone can be undesirable and even harmful depending upon the conditions present in a given environment. Ozone generation for a given Prior Art Wire Emitter length at normal room humidity, temperature and pressure can be a function of the material of the wire, the emitter current and the diameter of the wire. For a given emitter current and material, the smaller the diameter of the wire, the less ozone is produced. One disadvantage to small diameter wires is that they tend to wear down at a relatively high rate.

Accordingly, there is a need to overcome or otherwise reduce the disadvantages described above.

DETAILED DESCRIPTION

Figure 1A:
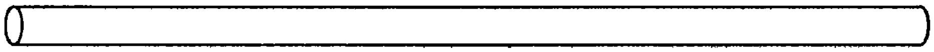
FIG. 1A is a perspective view of a Prior Art Wire Emitter.

FIG. 1A illustrates a perspective view of a Prior Art Wire Emitter. The use of a strip emitter electrode 10, as illustrated in FIGS. 1B and 1C, overcomes or reduces the problems related to Prior Art Wire Emitters by exhibiting a longer structural lifetime and generating desired levels of corona discharge associated with acceptable amounts of ozone.

Figure 1B:
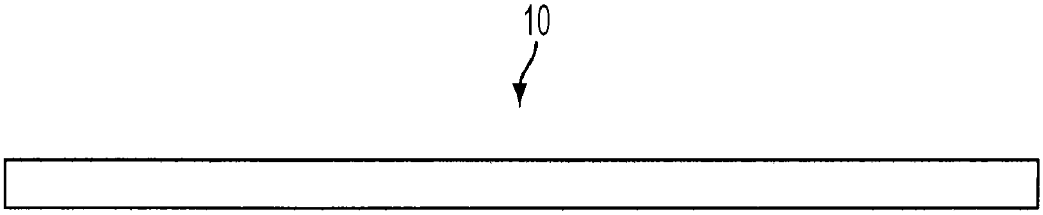
FIG. 1B is a perspective view of one embodiment of a strip emitter electrode, as described below.
Figure 1C:
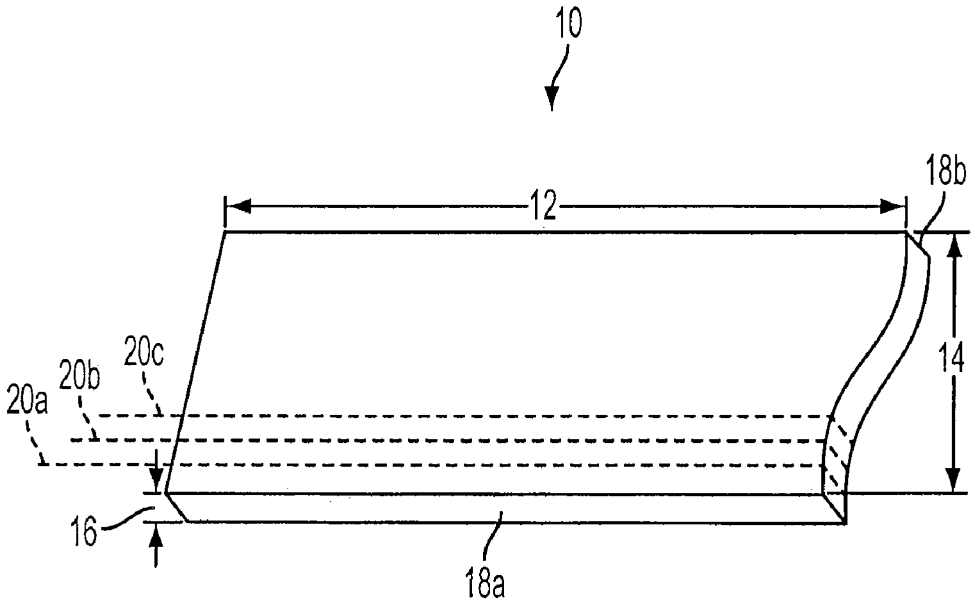
FIG. 1C is an enlarged, perspective view of one embodiment of a strip emitter electrode, as described below.

Referring now to FIGS. 1B and 1C, in one embodiment, the strip emitter electrode 10 includes a rectangular body having a length 12, a width 14, a thickness 16, and emission edges 18*a* and 18*b*. Edges 18*a* and 18*b* are defined by the length 12 and the thickness 16, and edges 18*a* and 18*b* extend along the length 12 of the strip emitter electrode 10. When a current flows through the strip emitter electrode 10, corona current concentrates on at least one of edges 18*a* and 18*b*. Accordingly, any erosion of the strip emitter electrode 10 caused by corona current progresses from the respective edge 18*a* or 18*b* of the strip emitter electrode 10 inward along the width 14. This enables strip emitter electrode 10 to perform the ionic emission function for a relatively long period of time. The concentration of corona at at least one of edges 18*a* and 18*b* of the strip emitter electrode 10 results in ionization similar to that resulting from corona emitted from a thin wire within corresponding levels of ozone generation.

With continued reference to FIG. 1C, erosion may progress inward from edge 18*a*. For example: after one period of operation, the edge 18*a* deteriorates and recedes to line 20*a*; after a longer period of operation, the edge 18*a* deteriorates and recedes to line 20*b*; and after an even longer period of time, the edge 18*a* deteriorates and recedes to line 20*c*. In on example, this process continues until the entire width 14 of the strip emitter electrode is depleted or disintegrated. The lifespan of the strip emitter electrode 10 is a function, in part, of the width 14 of the strip emitter electrode 10. All other variables being equal, in this example, the greater the width 14, the longer the lifespan of a strip emitter electrode 10. If edge 18*a* of the strip emitter electrode 10 were the only edge eroding due to current concentration, the life of the strip emitter electrode 10 would terminate approximately when the erosion reaches edge 18*b*. If both edges 18*a* and 18*b* are eroding due to current concentration, the life of the strip emitter electrode 10 would terminate approximately when the erosions lines extending inward from respective edges 18*a* and 18*b* converge.

Such a strip emitter electrode 10 may have any suitable rectangular geometry and have any suitable length 12, width 14 and thickness 16. For example, the width 14 of the strip emitter electrode 10 could extend from 0.1 mm upward. Additionally, the thickness 16 of the strip emitter electrode 10 could range from 0.01 mm to 0.15 mm. In one tested embodiment, the width 14 of the strip emitter electrode 10 is approximately 2.3 mm, and the thickness 16 of the strip emitter electrode 10 is approximately 0.02 mm. Additionally, the strip emitter electrode 10 may be composed of any suitable material. In one embodiment, the strip emitter electrode 10 is composed of molybdenum. In the illustrated and tested embodiment, the strip emitter electrode 10 has a flexible foil structure. It should be appreciated, however, that the strip emitter electrode 10 can have any suitable rigid or flexible structure, including, but not limited to: (a) a ribbon; (b) a foil; (c) a tape; (d) a belt or band; or (e) any other suitable relatively thin structure.

Referring now to Table 1 below, to demonstrate the relationship between Prior Art Wire Emitter diameter and ozone generation, consider a tungsten Prior Art Wire Emitter electrode between 0.1 and 0.12 mm in diameter. The following table illustrates the ozone production of such a Prior Art Wire Emitter electrode at a designated current as a function of the diameter of the wire.

TABLE 1

| Wire Diameter, mm | O3, mg/hr |
|---|---|
| 0.12 | 2.62 |
| 0.1 | 2.23 |
| 0.08 | 1.96 |

As illustrated in Table 1, ozone generation resulting from such Prior Art Wire Emitter decreases with wire diameter. However, as described above, smaller diameter wires may not have a sufficient lifespan for practical application, breaking and requiring replacement because corona current erodes the Prior Art Wire Emitters.

In one test, ozone generation of an air treatment apparatus including Prior Art Wire Emitter electrodes was measured as a function of current at designated currents. Then, ozone generation of the same air treatment apparatus including a plurality of the strip emitter electrodes 10 was measured at the same current. Then, the two sets of results where compared, as illustrated in Table 2 below. For this test, Prior Art Wire Emitters having a diameter of 0.12 mm were used. Molybdenum strip emitter electrodes, having a width of 2.3 mm and a thickness of 0.02 mm, were used. In this particular test, both the Prior Art Wire Emitters and such strip emitter electrodes 10 were operated in an air treatment apparatus which also includes collector and driver electrodes. In this test, the emitter electrodes and the collector electrodes were operatively coupled to a voltage generator. Table 2 below and FIG. 2 include relevant test data.

TABLE 2

| I, μA | O3, mg/hr Strip Emitter Electrodes | O3, mg/hr Prior Art Wire Emitter Electrodes |
|---|---|---|
| 200 | 1.8 | 2.8 |
| 400 | 3.7 | 5.5 |
| 600 | 5.5 | 8 |

Figure 2:
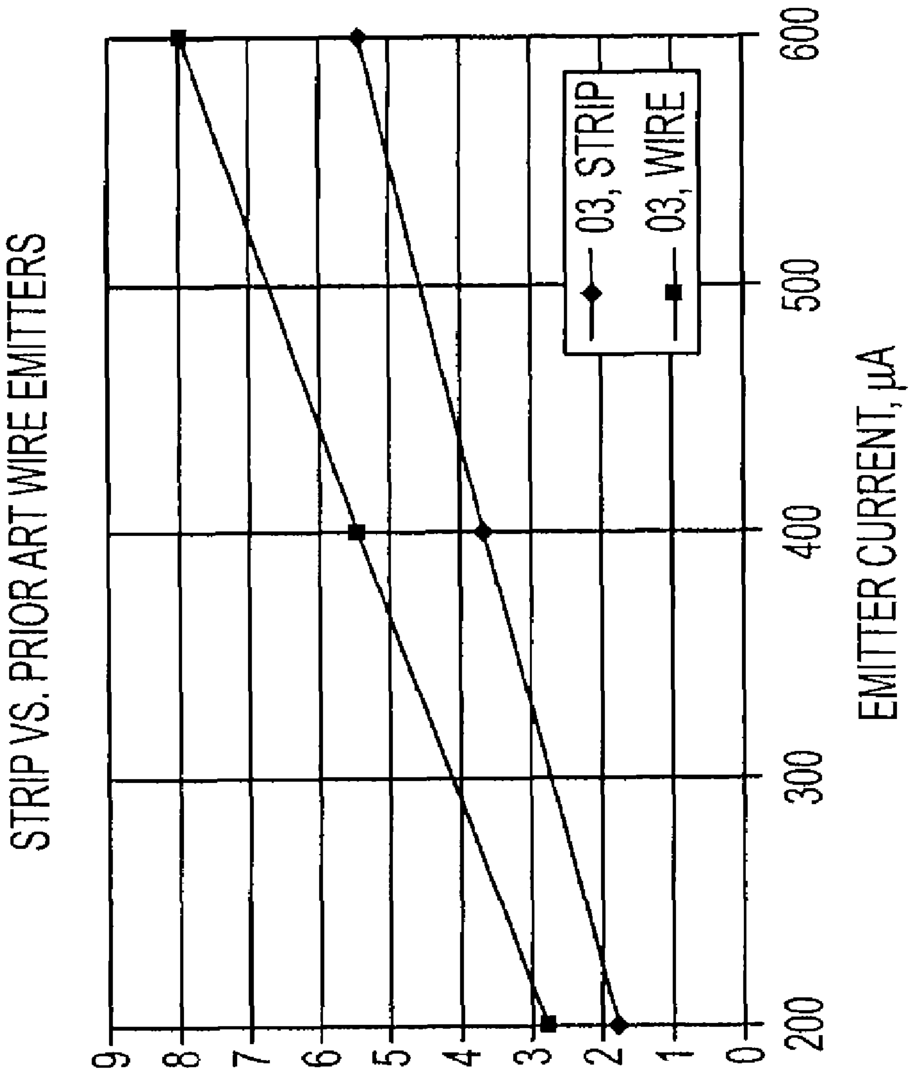
FIG. 2 is a graph indicating ozone production of an air treatment apparatus using one embodiment of a strip emitter electrode compared to a Prior Art Wire Emitter electrode used to generate the same emitter current.

As illustrated in Table 2 and FIG. 2, operating at the same designated currents, the use of the strip emitter electrodes resulted in less ozone generation than the use of the Prior Art Wire Emitter electrodes.

Performance of the air treatment apparatus used in this test was also measured in terms of Clean Air Delivery Rate ("CADR"). CADR is the amount of clean air measured in cubic feet per minute that an air cleaner delivers to a room. The performance of the air treatment apparatus used in this particular test, independent of ozone generation differentiation, was substantially similar when using the strip emitter electrodes 10, as opposed to the Prior Art Wire Emitters. This is illustrated by the sample estimated CADR results of Table 3 below. The "High," "Med," "Low," and "Quiet" designators in Table 3 refer to various operating modes of the air treatment apparatus from which these results were measured. While performing at similar CADR levels, the ozone generation using strip emitter electrodes 10 was significantly lower.

TABLE 3

| Mode | CADR (Prior Art Wire Emitter Electrode) | CADR (Strip Emitter Electrode) |
|---|---|---|
| High | 155.4 | 174.3 |
| Medium | 137.6 | 138.6 |
| Low | 124.3 | 135.2 |
| Quiet | 100.6 | 110.3 |

Figure 3:
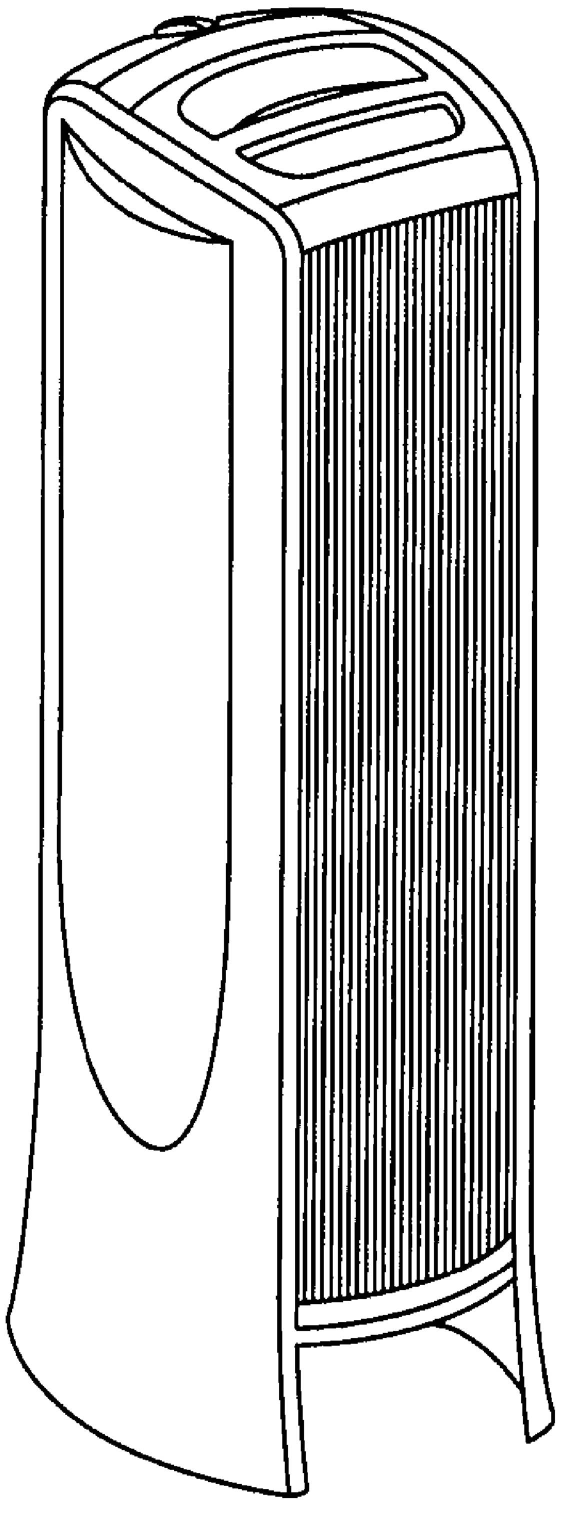
FIG. 3 is a front perspective view of one embodiment of an air treatment apparatus which includes the strip emitter electrode described below.

It should be appreciated that although the strip emitter electrode 10 described in this application was tested in an air treatment apparatus including a collector electrode in the foregoing example, the strip emitter electrode 10 may be incorporated into a variety of air treatment devices including, without limitation, various electrode configurations, pure ionizers (such as a strip emitter electrode which causes ions to flow toward any suitable grounded object), or any other suitable device. For example, the strip emitter electrode could be utilized in air treatment devices including at least one of: (a) emitter electrodes; (b) collector electrodes; (c) electrodes interstitially located between the collector electrodes (driver electrodes); and (d) additional suitable electrodes. An example of such a device is shown in FIG. 3, which illustrates an air treatment apparatus including an elongated housing which supports the internal components of the air treatment apparatus. In this illustration, the air treatment apparatus could include an electrode assembly with at least one of the strip emitter electrodes 10 illustrated in FIGS. 1B and 1C. Though the housing shown has an elongated shape, it should be understood that other shapes for the air treatment apparatus are suitable. In one embodiment, such air treatment apparatus includes a control panel for turning on and off the air treatment apparatus, or for changing operating settings (e.g., low, medium, high or quiet). In operation, the air treatment apparatus draws surrounding air into the apparatus through the front air inlet. The front air inlet can include a plurality of fins, slats or louvers that facilitate air flow into the apparatus. An electrode assembly in the air treatment apparatus cleans or removes particles from the air as air flows through the apparatus.

The apparatus can remove dust particles and other airborne particles from the air, including particles which cause odor, as well as particles present in smoke and other gases. Also, the apparatus can condition and treat the air by removing or altering chemicals present in the air. Furthermore, the apparatus can collect and kill airborne pathogens and micro-organisms through the effect of the electric field produced by the electrode assembly and cold plasma of corona discharge. Once cleaned or otherwise treated, the air exits the apparatus through the rear air outlet. Similar to the front air inlet, the rear air outlet can include a plurality of fins, slats or louvers that facilitate air flow out of the apparatus.

In one embodiment, the strip emitter electrode 10 includes a first end and a second end, the first and second end both held by a tensioning mechanism or holder which holds the strip emitter electrode tight in a linear configuration, eliminating or reducing slack.

In various embodiments, the strip emitter electrode may be either a permanent or replaceable component of an air treatment apparatus or any device. Alternatively, the strip emitter electrode may constitute a device in and of itself (i.e., a pure ionizer as described above), used with a voltage source. In such embodiment, the strip emitter electrode can be a replaceable item.

Additionally, the strip emitter electrode may be fabricated in a variety of ways and by a variety of devices. For example, the strip emitter electrode could be produced as a product of: (a) a laser cutting method; (b) mechanical cutting method; (c) any combination of these methods; or (d) any suitable fabrication method like, for example, rolling. Such methods could employ a variety of cutting devices, including: (i) lasers; (ii) mechanical cutters; (iii) any combination of these devices; or (iv) any suitable device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electro-kinetic airflow producing device comprising:

a strip-type emitter electrode and plural collector electrodes operatively and respectively coupled to a voltage source to generate a corona discharge and thereby produce the airflow, the strip-type emitter electrode having a length, a width, a thickness, and at least one emission edge which extends along the length of the emitter electrode, wherein the thickness of the emitter electrode is less than about 0.15 mm and wherein the emission edge thereof is subject to erosion based on the corona discharge during operation of the electro-kinetic airflow producing device, the erosion progressing in the width dimension of the emitter electrode, the width substantially exceeding the thickness and thereby extending the operative lifetime of the emitter electrode as compared with a wire-type emitter electrode design having substantially identical width and thickness.

2. The electro-kinetic airflow producing device of claim 1, wherein the strip-type emitter electrode has a flexible characteristic, a first end, and a second end, the first end and the second being configured to be held in place by at least one holder.

3. The electro-kinetic airflow producing device of claim 1, wherein the strip-type emitter electrode is fabricated using a cutting or rolling device selected from the group consisting of: (a) a laser; (b) a mechanical cutter; (c) any combination of a laser and a mechanical cutter; and (d) a roller.

4. The electro-kinetic airflow producing device of claim 1, configured as an ionic air treatment apparatus.

5. The electro-kinetic airflow producing device of claim 1, configured as an electro-kinetic air transporter-conditioner.

6. The electro-kinetic airflow producing device of claim 1, wherein the strip-type emitter electrode has a structure selected from the group consisting of: a ribbon; a foil; a tape; a belt; and a band.

7. The electro-kinetic airflow producing device of claim 6, wherein the strip-type emitter electrode is flexible along its length.

8. The electro-kinetic airflow producing device of claim 1, further comprising:

an additional electrode positioned generally between a respective pair of the collector electrodes and downstream of the strip-type emitter electrode, the additional electrode operatively coupled to the voltage source as a driver electrode.

9. The electro-kinetic airflow producing device of claim 8, wherein the driver electrode is insulated.

10. The electro-kinetic airflow producing device of claim 1, further comprising:

at least one additional strip-type emitter electrode coupled to the voltage source to generate a corona discharge and thereby contribute to the produced airflow.

11. An electro-kinetic airflow producing device comprising:

a voltage supply;

two or more collector electrodes; and at least one strip-type emitter electrode, the strip-type emitter electrode and collector electrodes coupled to the voltage supply and positioned to generate a corona discharge proximate an emission edge of the strip-type emitter electrode and thereby contribute to the produced airflow, the emission edge of the strip-type emitter electrode exhibiting a generally downstream facing cross-sectional thickness of less than about 0.15 mm and tolerating erosion of the emission edge in a generally upstream-oriented width dimension of the strip-type emitter electrode, a ratio of erosion-tolerating width to cross-sectional thickness being at least 10:1.

12. The electro-kinetic airflow producing device of claim 11, wherein the thickness is greater than about 0.01 mm.

13. The electro-kinetic airflow producing device of claim 12, wherein the thickness is approximately 0.02 mm.

14. The electro-kinetic airflow producing device of claim 11, wherein the strip-type emitter electrode is composed of molybdenum.

15. The electro-kinetic airflow producing device of claim 11, wherein the tolerated erosion of material in the width dimension of the strip-type emitter electrode exceeds the thickness thereof.

16. A method of extending an operational lifetime of an emitter electrode in an electro-kinetic airflow producing device, while generating a desirable level of corona discharge and limiting ozone production, the method comprising:

providing a strip-type emitter electrode that exhibits a length, a width and a thickness;

sizing the thickness of the strip-type emitter electrode in accord with emitter electrode material and operative emitter currents to generate a desired level of corona discharge with no more than an acceptable level of ozone production;

sizing the width of the strip-type emitter electrode to tolerate erosion of material thereof throughout a desired operative lifetime of the emitter electrode, wherein the desired operative lifetime exceeds that during which operation of the electro-kinetic airflow producing device would be expected to erode, in the width dimension, an amount of material of the emitter electrode that exceeds the thickness thereof.

17. The method of claim 16, providing plural collector electrodes positioned generally downstream of the strip-type emitter electrode.

18. The method of claim 16, wherein the strip-type emitter electrode is composed of Molybdenum.

19. The method of claim 16, based on the thickness sizing, providing the strip-type emitter electrode with a thickness in a range from 0.01 mm to 0.15 mm.

20. The method of claim 16, based on the width sizing, providing the strip-type emitter electrode with a width that exceeds at least 0.1 mm.

21. The method of claim 16, based on the thickness and width sizing, providing the strip-type emitter electrode with a ratio of width to thickness of at least 10:1.

22. The method of claim 16, providing one or more additional strip-type emitter electrodes.

* * * * *